(12) United States Patent
Hein et al.

(10) Patent No.: US 7,370,995 B2
(45) Date of Patent: May 13, 2008

(54) CONSOLE AND LIGHT ASSEMBLY

(75) Inventors: David A. Hein, Sterling Heights, MI (US); Hiroyuki Maeda, Canton, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 208 days.

(21) Appl. No.: 11/381,620

(22) Filed: May 4, 2006

(65) Prior Publication Data

US 2007/0258228 A1 Nov. 8, 2007

(51) Int. Cl.
*F21V 9/00* (2006.01)
(52) U.S. Cl. ........................ 362/511; 362/488
(58) Field of Classification Search ............ 362/26–27, 362/29–30, 551, 488, 492, 511, 85
See application file for complete search history.

(56) References Cited

U.S. PATENT DOCUMENTS

| | | | |
|---|---|---|---|
| 5,062,559 A | 11/1991 | Falcoff | |
| 5,582,474 A | 12/1996 | Van Order et al. | |
| 6,257,745 B1 | 7/2001 | Speth et al. | |
| 6,283,621 B1 | 9/2001 | Macri | |
| 6,601,976 B1 | 8/2003 | Rhee | |
| 6,749,324 B2 | 6/2004 | Nagai et al. | |
| 6,799,875 B2 | 10/2004 | Flokstra et al. | |
| 6,874,922 B2 * | 4/2005 | Matsuura et al. | 362/497 |
| 6,890,089 B2 | 5/2005 | Haering et al. | |
| 6,974,238 B2 | 12/2005 | Sturt et al. | |
| 6,975,215 B2 * | 12/2005 | Schofield et al. | 340/438 |
| 2003/0063477 A1 | 4/2003 | Stepanenko et al. | |
| 2004/0027837 A1 * | 2/2004 | Hsu | 362/551 |
| 2004/0057246 A1 | 3/2004 | Flokstra et al. | |
| 2005/0121932 A1 | 6/2005 | Taylor | |
| 2005/0254250 A1 | 11/2005 | Nagai et al. | |
| 2006/0113810 A1 * | 6/2006 | Kuhl et al. | 296/24.34 |

* cited by examiner

*Primary Examiner*—Ali Alavi
(74) *Attorney, Agent, or Firm*—Brooks Kushman P.C.

(57) ABSTRACT

A console assembly and a light assembly for a motor vehicle. The light assembly includes a light pipe and a light module. The light pipe has opposing first and second surfaces and opposing interior and exterior surfaces. The light module disposed adjacent to the interior surface. The second surface has a groove disposed between the interior and exterior surfaces that is configured to receive a console unit.

20 Claims, 4 Drawing Sheets

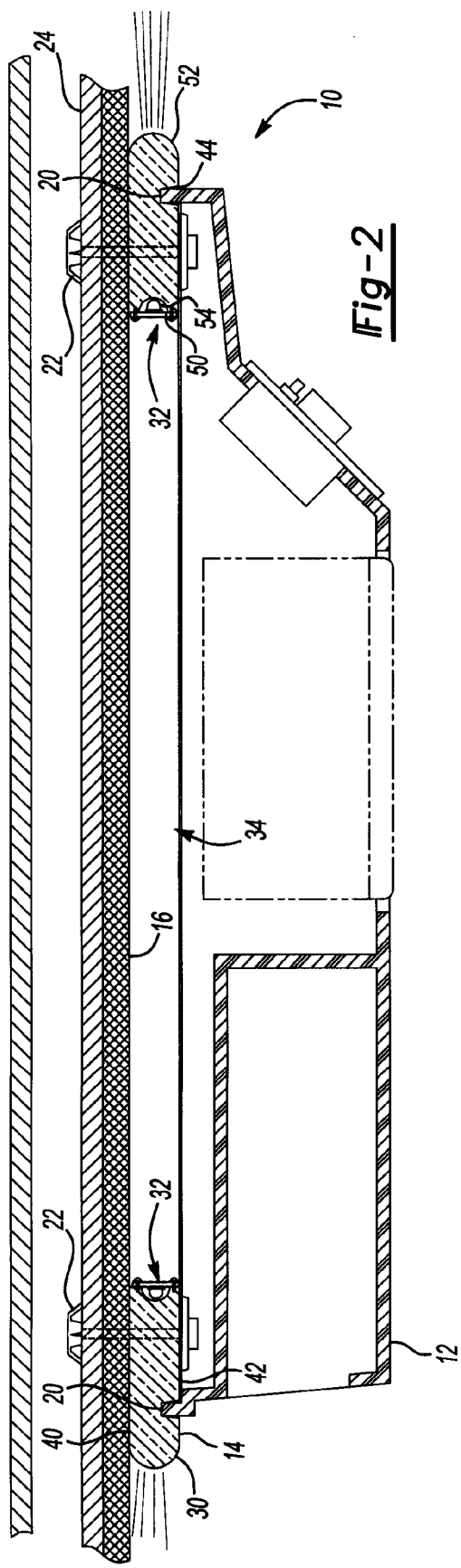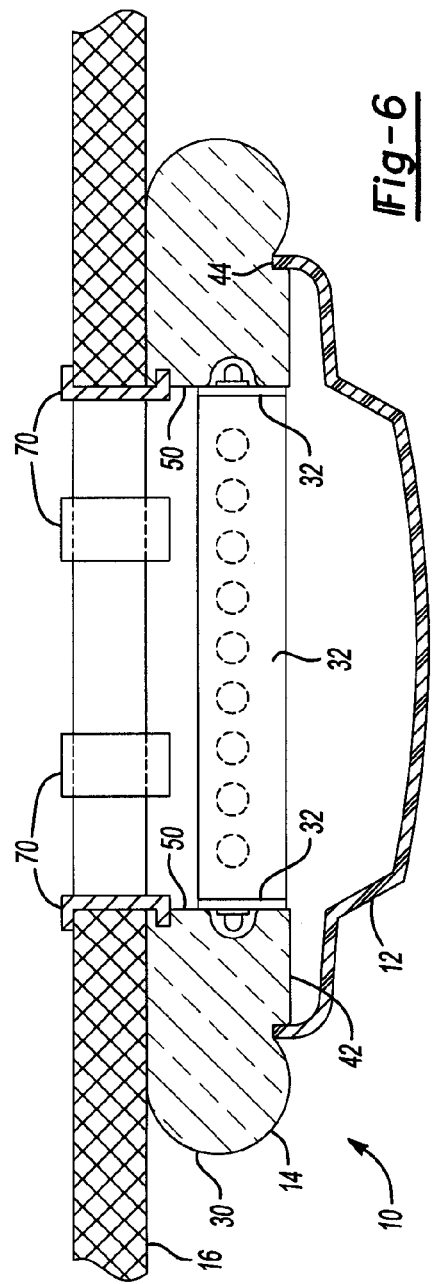

CONSOLE AND LIGHT ASSEMBLY

BACKGROUND OF THE INVENTION

Field of the Invention

The present invention relates to a light assembly that may be provided with a console unit as a console assembly.

SUMMARY OF THE INVENTION

In at least one embodiment of the present invention, a light assembly for use with a console unit is provided. The light assembly has a light pipe and a light module. The light pipe has opposing first and second surfaces and opposing interior and exterior surfaces. The light module is disposed adjacent to the interior surface and has a light source and a circuit for controlling the light source. The second surface has a groove disposed between the interior and exterior surfaces that is configured to receive the console unit.

In at least one other embodiment of the present invention, a console assembly is provided. The console assembly includes a console unit having a rim and a light assembly. The light assembly has a light pipe and a light module. The light pipe has opposing first and second surfaces and opposing interior and exterior surfaces. The light module is disposed adjacent to the interior surface and has a light source and a circuit for controlling the light source. The second surface has a groove disposed between the interior and exterior surfaces that is configured to receive the rim and align the light pipe with the console unit.

In at least one other embodiment of the present invention, a console assembly for a motor vehicle is provided. The console assembly includes a console unit having a rim and a fastener. The light assembly has a light pipe and a light module. The light pipe has opposing first and second surfaces, opposing interior and exterior surfaces, and a through hole extending between the first and second surfaces. The light module is disposed adjacent to the interior surface and has a light source and a circuit for controlling the light source. The second surface has a groove disposed between the interior and exterior surfaces that is configured to receive the rim and align the light pipe with the console unit. The fastener extends through the through hole and has a first configuration for coupling the console unit to the mounting surface when the light assembly is provided. The fastener has a second configuration for coupling console unit to the mounting surface when the light assembly is not provided.

BRIEF DESCRIPTION OF THE DRAWINGS

FIG. 2 is a section view of along section line 2-2 of FIG. 1.

FIG. 6 is a section view of a console assembly having a fifth embodiment of a light assembly disposed between a console unit and a vehicle surface.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
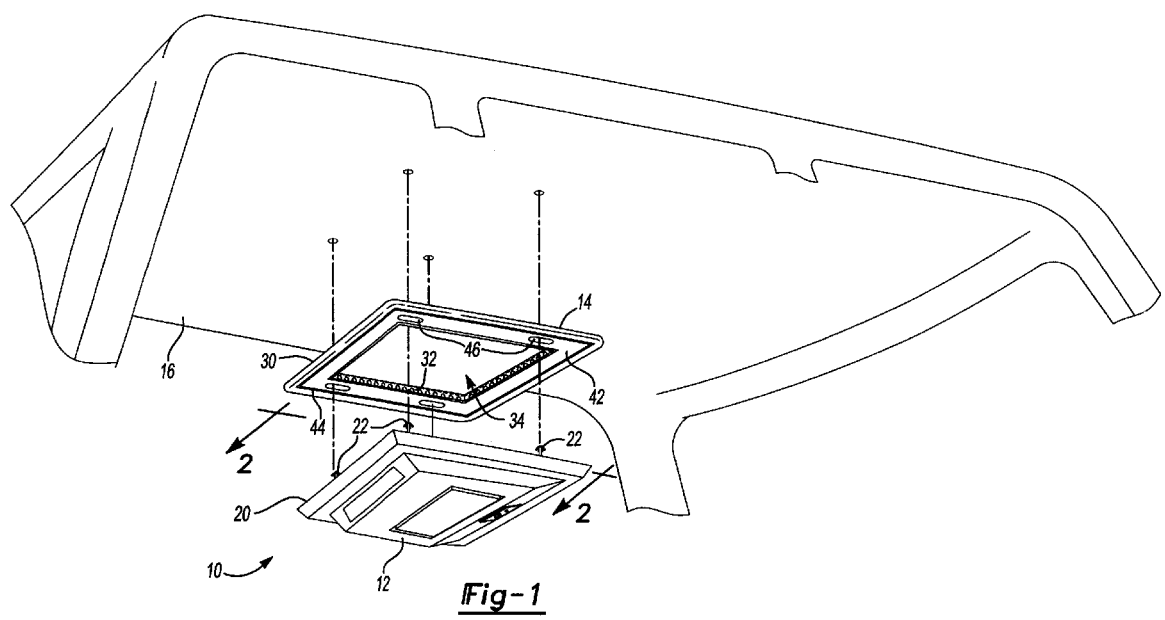
FIG. 1 is an exploded perspective view of one embodiment of a console assembly having a light assembly disposed between a console unit and a vehicle surface.

Referring to FIGS. 1 and 2, an exploded view of an exemplary console assembly 10 is shown. The console assembly 10 may include a console unit 12 and a light assembly 14. The console assembly 10 may be provided in a motor vehicle in any suitable location. For example, the console assembly 10 may be provided as a floor-mounted assembly or an overhead-mounted assembly and may be disposed adjacent to a vehicle surface 16 like a floor or headliner. In FIG. 1, an overhead-mounted console assembly is shown disposed adjacent to a vehicle surface configured as a headliner.

The console unit 12 may have any suitable configuration. For instance, the console unit 12 may include one or more storage bins, coin holders, hooks, display screens, cup holders, armrests, electrical power sources, climate control vent registers, and/or controls depending on the mounting location and design requirements. The console unit 12 may also include a rim 20 and one or more fasteners 22.

The rim 20 may extend toward the vehicle surface 16 to help conceal gaps and provide a desired appearance. For instance, the rim 20 may engage the light assembly 14, if provided, and may engage the vehicle surface 16 if a light assembly 14 is not provided.

The fasteners 22 may extend from the console unit 12 to facilitate mounting of the console unit 12. For instance, the fasteners 22 may be disposed near the rim 20 and may be configured to engage a mounting surface 24, such as a vehicle body structure like a frame or panel. In the embodiment shown in FIGS. 1 and 2, four fasteners are provided that extend toward and through the vehicle surface 16 to engage a vehicle body structure. In addition, one or more fasteners 22 may be configured to facilitate mounting of a console unit 12 either with or without a light assembly 14. For example, one or more fasteners 22 may have an adjustable configuration so that the console unit 12 is disposed adjacent to the light assembly 14 when a light assembly 14 is provided and disposed adjacent to the vehicle surface 16 when a light assembly 14 is not provided. As such, one or more fasteners 22 may be adjustable between a first configuration (e.g., first position or length) when a light assembly 14 is provided and a second configuration (e.g., second position or length) when a light assembly 14 is not provided.

The light assembly 14 may be configured to provide interior vehicle lighting. For example, the light assembly 14 may be configured to provide localized lighting near the perimeter of the console unit 12 to improve visibility of the location of the console unit 12 and/or provide a low level of illumination inside the vehicle that may provide an aesthetically pleasing appearance. The light assembly 14 may be provided as a modular component that may optionally be installed with a console unit 12 to accommodate a particular vehicle configuration or vehicle option package.

The light assembly 14 may have any suitable configuration. For example, the light assembly 14 may include a light pipe 30 and one or more light modules 32.

The light pipe 30 may be made of any suitable material that permits the transmission of light. For example, the light pipe 30 may be made of a material that is at least partially transparent or translucent, such as polycarbonate. The light pipe 30 may have any suitable configuration. In the embodiment shown in FIGS. 1 and 2, the light pipe 30 is generally ring-shaped and defines an interior opening 34. Alternatively, the light pipe 30 could have a U-shaped, linear, or curved configuration or combinations thereof.

The light pipe 30 may include a plurality of surfaces. For example, the light pipe 30 may include opposing first and second surfaces 40,42. The first surface 40 may be disposed adjacent to the vehicle surface 16. For example, the first surface 40 may be an upper surface when provided with an overhead console unit and may be a lower surface when provided with a floor-mounted console unit. Similarly, the second surface 42 may be a lower surface when provided with an overhead console unit and may be an upper surface when provided with a floor-mounted console unit.

A recess or groove 44 may be provided on the second surface 42 and may be configured to receive the rim 20 of the console unit 12. As such, the groove 44 may help position the light assembly 14 relative to the console unit 12 and may help conceal any gaps to provide improved appearance. In the embodiment shown in FIGS. 1 and 2, the groove 44 is generally ring-shaped and extends around the interior opening 34. Alternatively, the groove 44 may have other configurations that accommodate differently shaped rims and console units.

One or more through holes 46 may extend through the light pipe 30 for receiving one or more fasteners 22. The through holes 46 may have any suitable configuration. In the embodiment shown in FIGS. 1 and 2, the through holes 46 are configured as elongated slots to simplify alignment and assembly.

The light pipe 30 may also include opposing interior and exterior surfaces 50,52. The interior surface 50 may be disposed such that it is concealed by the console unit 12 when the console unit 12 is disposed proximate the light assembly 14. The exterior surface 52 may be generally visible when the console unit 12 is disposed proximate the light assembly 14. For example, the exterior surface 52 may generally be disposed between the groove 44 and the first surface 40.

Figure 3:
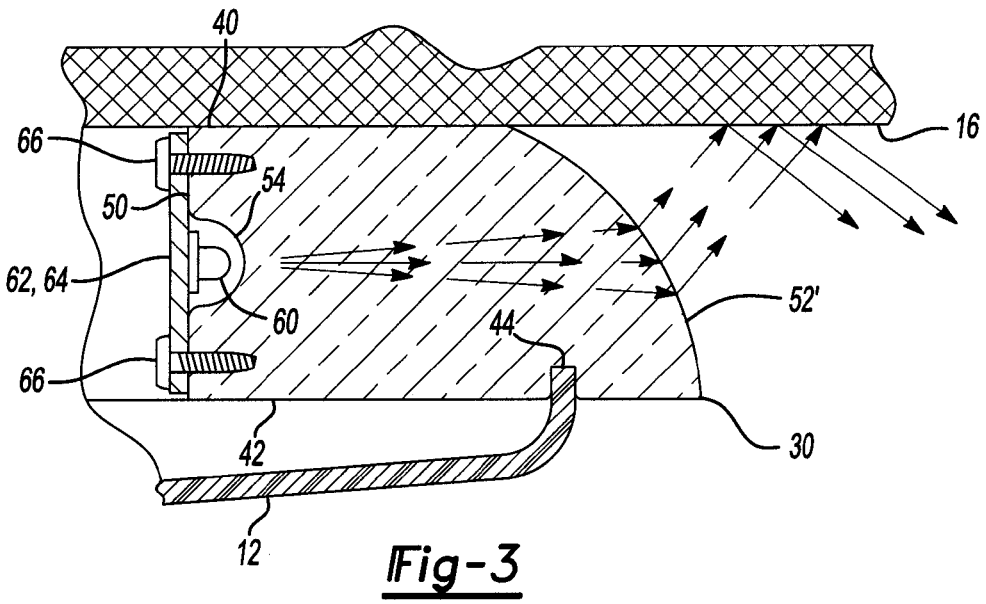
FIG. 3 is a fragmentary section view of a second embodiment of a light assembly.
Figure 4:
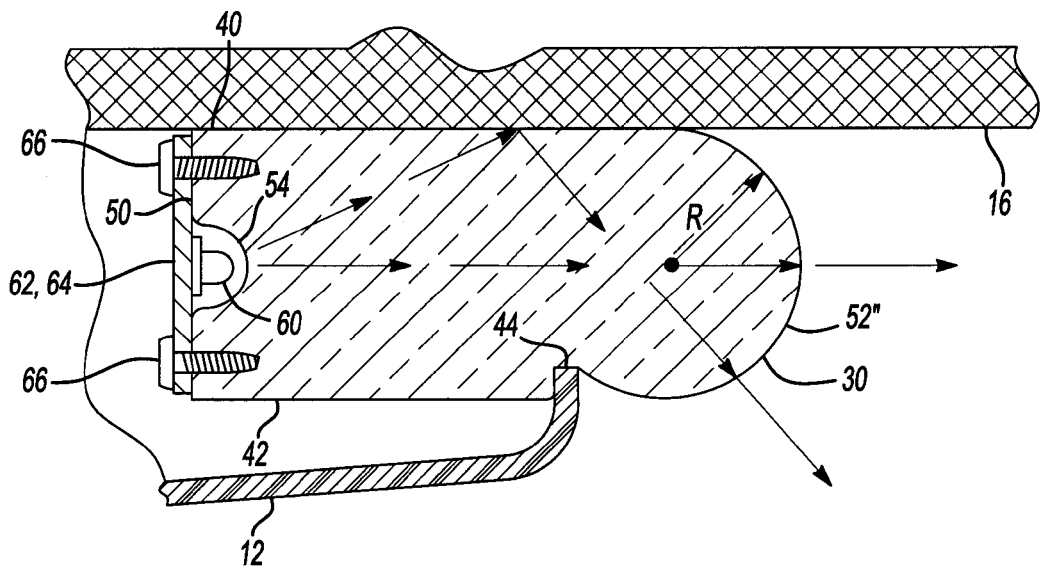
FIG. 4 is a fragmentary section view of a third embodiment of a light assembly.
Figure 5:
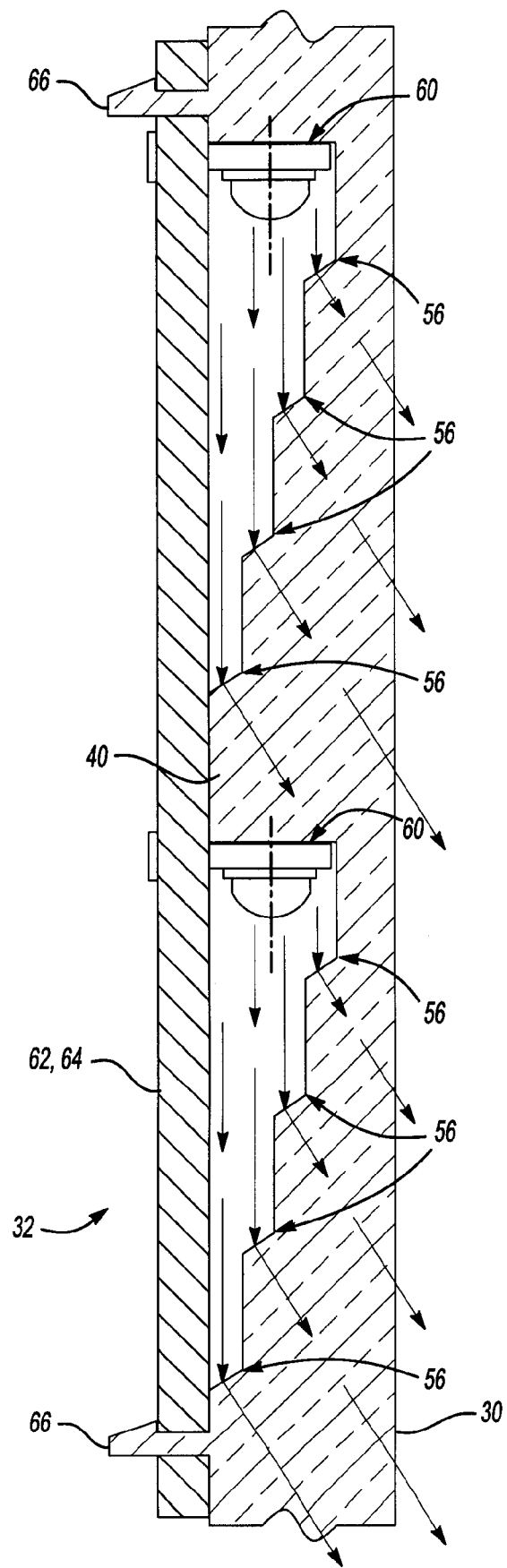
FIG. 5 is a fragmentary section view of a fourth embodiment of a light assembly

The interior surface 50 may have various configurations. For instance, the interior surface 50 may include one or more indentations 54 that extend toward the exterior surface 52 as is shown in FIGS. 2-4. Each indentation 54 may receive one or more light sources to help direct light into the light pipe 30 or protect light sources from damage. In addition, the interior surface may include a plurality of steps 56 as shown in FIG. 5. The steps 56 disposed adjacent to each other and be adapted to redirect light from the light source toward the exterior surface. As such, the steps 56 may help distribute light with generally even illumination characteristics over an extended distance, which may reduce the number of light sources provided with the light assembly 14.

The exterior surface may have various configurations. In the embodiment shown in FIG. 3, the exterior surface 52' is generally curved outward from the first surface 40 toward the second surface 42. As such, the exterior surface 52' may be configured to generally direct light toward the vehicle surface 16 so that the light may reflect off the vehicle surface 16 to provide improved visibility and/or a desired appearance. In the embodiment shown in FIG. 4, the exterior surface 52" is generally arcuate such that the exterior surface 52" may have a generally constant radial cross section. As such, at least a portion of the exterior surface 52" may generally direct light toward the vehicle surface 16 while another portion of the radial surface may help direct light away from the vehicle surface 16 and/or toward the console unit 12 to provide improved visibility and/or a desired appearance.

The light module 32 may be adapted to provide light to the light pipe 30 and may have any suitable configuration. For example, the light module 32 may include one or more light sources 60 and an electrical circuit 62 that may control operation of one or more light sources 60.

The light source 60 may be of any suitable type. For instance, the light source 60 may be a light emitting diode (LED) or a bulb, such as an incandescent or fluorescent bulb. In addition, one or more light sources 60 may be configured to provide light in different colors or with different tints. For example, yellow, green, and/or blue LEDs or tinted bulbs may be used to provide illumination having one or more colors or tints. In addition, the light source 60 may be configured with a side mount configuration as shown in FIG. 5 in which the center axis of the light source 60 is oriented generally perpendicular to the second and/or interior surfaces.

One or more light sources 60 may be mounted on a circuit board 64 that accommodates the electrical circuit 62 and associated components that may facilitate powering and control of the light sources 60. The circuit board 64 may be of any suitable type, such as a rigid circuit board or a flexible circuit board. A plurality of rigid circuit boards may be electrically coupled to allow multiple electrical circuits to be powered by a single power source connection. A flexible circuit board may be positioned along a curved surface or intersecting surfaces to provide improved alignment, reduce the number of individual circuit boards, and/or simplify assembly. Circuit boards 64 may be mounted in any suitable manner. For instance, a circuit board 64 may be disposed adjacent or proximate an interior surface 52 and mounted with one or more attachment features 66, such as removable fasteners as shown in FIGS. 3 and 4, or the locking tabs shown in FIG. 5.

Referring to FIG. 6, the light assembly 14 may also include one or more retention features 70 for mounting the light assembly 14 to another vehicle component. The retention features 70 may have any suitable configuration. For instance, the retention features 70 may be configured as clips and may extend from or be disposed adjacent to the interior surface 50 and extend away from the second surface 42 to facilitate mounting the light assembly 14. In the embodiment shown in FIG. 6, the retention features 70 extend though an aperture in the vehicle surface 16 to hook and secure the light assembly 14. As such, the retention features 70 may facilitate mounting or temporary securing of the light assembly 14 independent from the fasteners 22 or being secured using the console unit 12.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A light assembly for use with a console unit, the light assembly comprising:

a light pipe having opposing first and second surfaces and opposing interior and exterior surfaces; and a light module disposed adjacent to the interior surface, the light module including a light source and a circuit for controlling the light source;

wherein the second surface has a groove disposed between the interior and exterior surfaces that is configured to receive the console unit.

2. The light assembly of claim 1 wherein the light pipe further comprises a hole extending between the first and second surfaces through which a fastener extends to mount the console unit to a motor vehicle.

3. The light assembly of claim 1 wherein the light pipe further comprises an indentation extending from the interior surface toward the exterior surface and wherein the light source extends into the indentation.

4. The light assembly of claim 1 wherein the interior surface further comprises a plurality of steps disposed adjacent to each other for redirecting light from the light source toward the exterior surface.

5. The light assembly of claim 1 further comprising a retention feature disposed adjacent to the interior surface and extending away from the second surface for mounting the light assembly.

6. The light assembly of claim 1 wherein the exterior surface of the light pipe is curved such that light from the light source is directed generally away from the second surface.

7. The light assembly of claim 1 wherein the exterior surface of the light pipe has a substantially circular cross section.

8. A console assembly, comprising:
a console unit having a rim; and
a light assembly including:
a light pipe having opposing first and second surfaces and opposing interior and exterior surfaces; and
a light module disposed adjacent to the interior surface, the light module including a light source and a circuit for controlling the light source;
wherein the second surface has a groove disposed between the interior and exterior surfaces that is configured to receive the rim and align the light pipe with the console unit.

9. The console assembly of claim 8 wherein the light pipe is substantially ring shaped and includes light modules for illuminating opposing sides of the light pipe.

10. The console assembly of claim 8 wherein the console unit further comprises a fastener and the light pipe further comprises a through hole extending between the first and second surfaces, wherein the fastener extends through the through hole.

11. The console assembly of claim 8 wherein the light assembly is disposed between the console unit and a headliner.

12. The console assembly of claim 11 wherein the headliner further comprises an aperture and the light assembly further comprises a retention feature that extends through the aperture and couples the light assembly to the headliner.

13. The console assembly of claim 8 wherein the light assembly is disposed between the console unit and an interior vehicle surface.

14. The console assembly of claim 13 wherein the first surface of the light pipe is disposed adjacent to the interior vehicle surface.

15. The console assembly of claim 8 wherein the light pipe further comprises an indentation extending from the interior surface toward the exterior surface and wherein the light source extends into the indentation.

16. A console assembly for a motor vehicle having a mounting surface, the console assembly comprising:
a console unit having a rim and a fastener; and
a light assembly including:
a light pipe having opposing first and second surfaces and opposing interior and exterior surfaces and a through hole extending between the first and second surfaces; and
a light module disposed adjacent to the interior surface, the light module including a light source and a circuit for controlling the light source;
wherein the second surface has a groove disposed between the interior and exterior surfaces that is configured to receive the rim and align the light pipe with the console unit; and
wherein the fastener extends through the through hole and has a first configuration to couple the console unit to the mounting surface when a light assembly is provided and wherein the fastener extends through the through hole has a second configuration to couple the console unit to the mounting surface when the light assembly is not provided between the mounting surface and the console unit.

17. The console assembly of claim 16 wherein the interior surface of the light pipe further comprises a plurality of steps disposed adjacent to each other for redirecting light from the light source toward the exterior surface and wherein the light module further comprises a circuit board mounted to the light pipe and the light source is a side mount light emitting diode mounted on and oriented generally perpendicular to the second and interior surfaces.

18. The console assembly of claim 16 wherein the light pipe further comprises first and second interior surfaces and first and second light modules disposed adjacent to the first and second interior surfaces, respectively, for illuminating different exterior surfaces of the light pipe.

19. The console assembly of claim 16 wherein the exterior surface of the light pipe has a constant radius in an area extending between the first surface and the groove.

20. The console assembly of claim 16 wherein the exterior surface is curved between the first surface and the second surface such that a first point of intersection between the first and exterior surfaces is located closer to the light source than a second point of intersection between the second and exterior surface.

* * * * *